US010953506B2

(12) United States Patent
Chan et al.

(10) Patent No.: US 10,953,506 B2
(45) Date of Patent: Mar. 23, 2021

(54) SELF-BALANCING LINE SHAFT OF A MACHINE TOOL

(71) Applicant: NATIONAL FORMOSA UNIVERSITY, Hu-Wei Township, Yun-Lin County (TW)

(72) Inventors: Tzu-Chi Chan, Hu-Wei Township (TW); Shang-Hong Wu, Hu-Wei Township (TW)

(73) Assignee: NATIONAL FORMOSA UNIVERSITY, Hu-Wei Township (TW)

(*) Notice: Subject to any disclaimer, the term of this patent is extended or adjusted under 35 U.S.C. 154(b) by 13 days.

(21) Appl. No.: 16/421,704

(22) Filed: May 24, 2019

(65) Prior Publication Data
US 2020/0368865 A1 Nov. 26, 2020

(51) Int. Cl.
B23Q 11/00 (2006.01)
B23Q 5/20 (2006.01)
B23Q 3/12 (2006.01)

(52) U.S. Cl.
CPC ............ B23Q 5/20 (2013.01); B23Q 11/0032 (2013.01); B23Q 3/12 (2013.01); B23Q 2220/006 (2013.01)

(58) Field of Classification Search
CPC .. B23Q 11/0032; B23Q 11/0035; B23Q 5/20; B23B 31/261; B23C 5/003; B23C 2250/04
See application file for complete search history.

(56) References Cited

U.S. PATENT DOCUMENTS 4,711,610 A * 12/1987 Riehl ................. B23Q 11/0035
269/21
6,810,733 B2 * 11/2004 Fischer .............. B23Q 11/0035
73/462
6,951,256 B1 * 10/2005 Xiao .................... B23B 31/261
173/165

FOREIGN PATENT DOCUMENTS

EP 1738865 A1 * 1/2007 ........... B24B 41/042

OTHER PUBLICATIONS

English translation of EP 1738865, Jan. 2007 (Year: 2007).*

* cited by examiner

Primary Examiner — Alan Snyder
(74) Attorney, Agent, or Firm — Fox Rothschild LLP; Robert J. Sacco; Carol E. Thorstad-Forsyth

(57) ABSTRACT

A self-balancing line shaft of a machine tool includes a spindle device, a cutter tool holder and at least one balancing assembly. The spindle device includes a spindle extending along and rotatable about an axis, and at least one precision lock nut threadedly engaged with and rotated with the spindle. The cutter tool holder is coaxially connected and rotated with the spindle. The balancing assembly includes an annular groove formed in one of the precision lock nut and the cutter tool holder and extending along a circle path surrounding the axis, and a plurality of weight members disposed in the annular groove to be moved in a direction opposite to a rotation unbalance during rotation of the spindle such that the center of mass of the whole rotating system is close to the axis.

4 Claims, 7 Drawing Sheets

SELF-BALANCING LINE SHAFT OF A MACHINE TOOL

FIELD

The disclosure relates to a machine tool, and more particularly to a self-balancing line shaft of a machine tool.

BACKGROUND

In order for a spindle device of a machine to reach a high rotational speed with a cutter tool holder thereof while maintaining a high machining precision, measurement and correction of any rotating unbalance of the spindle device is regularly conducted to prevent occurrence of chatter and undesired vibration. When doing so, the machine tool has to be shut off, which increases downtime of the machine tool and leads to undesirable increase in the manufacturing cost.

SUMMARY

Therefore, an object of the disclosure is to provide a self-balancing line shaft of a machine tool that can alleviate at least one of the drawbacks of the prior art.

According to the disclosure, the self-balancing line shaft includes a spindle device, a cutter tool holder and at least one balancing assembly.

The spindle device includes a spindle which extends along an axis and is driven to be rotated about the axis, and at least one precision lock nut which is threadedly engaged with the spindle in an axial direction of the axis. The precision lock nut has a ring-shaped nut body which has inner and outer ring surfaces surrounding the axis and radially opposite to each other, and two ring end surfaces interconnecting the inner and outer ring surfaces and opposite to each other along the axis. The inner ring surface has an internal thread section.

The cutter tool holder is coaxially connected with the spindle to be rotated about the axis. The cutter tool holder includes a holder body which has a mounting portion that is separably connected to an end portion of the spindle and that extends along the axis, a holding portion that is opposite to the mounting portion along the axis and for holding a cutter tool, and an annular portion that is raised radially and outwardly from the mounting portion and that is disposed between the mounting portion and the holding portion.

The balancing assembly is disposed on one of the precision lock nut and the cutter tool holder. The balancing assembly includes an annular groove which is formed in one of the nut body and the holder body and which extends along a circle path that surrounds the axis, and a plurality of weight members which are movable and disposed in the annular groove along the circle path. A total volume of the weight members is not larger than half of a volume of the annular groove such that, when the weight members are adjoined to one another in the annular groove, two terminal sides each defined by interconnecting an outermost one of the weight members and the axis cooperatively form an included angle that is not more than 180 degrees.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
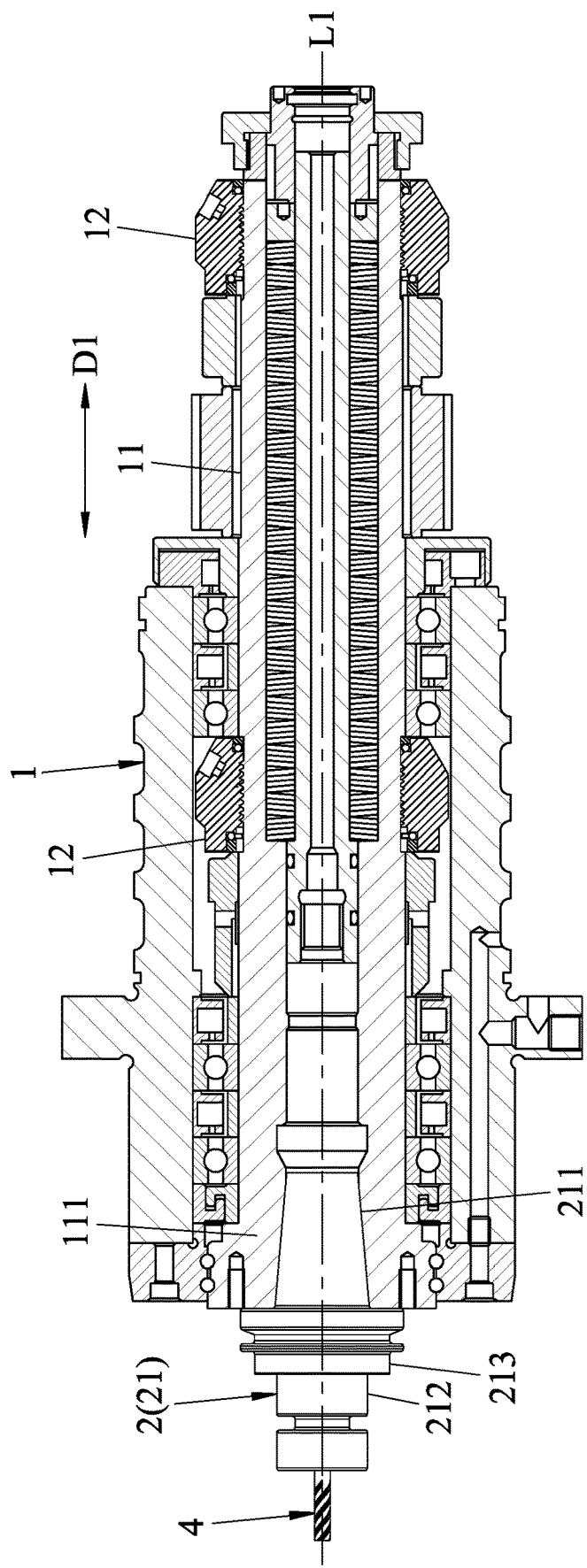
FIG. 1 is a partly sectional view illustrating a first embodiment of a self-balancing line shaft of a machine tool according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
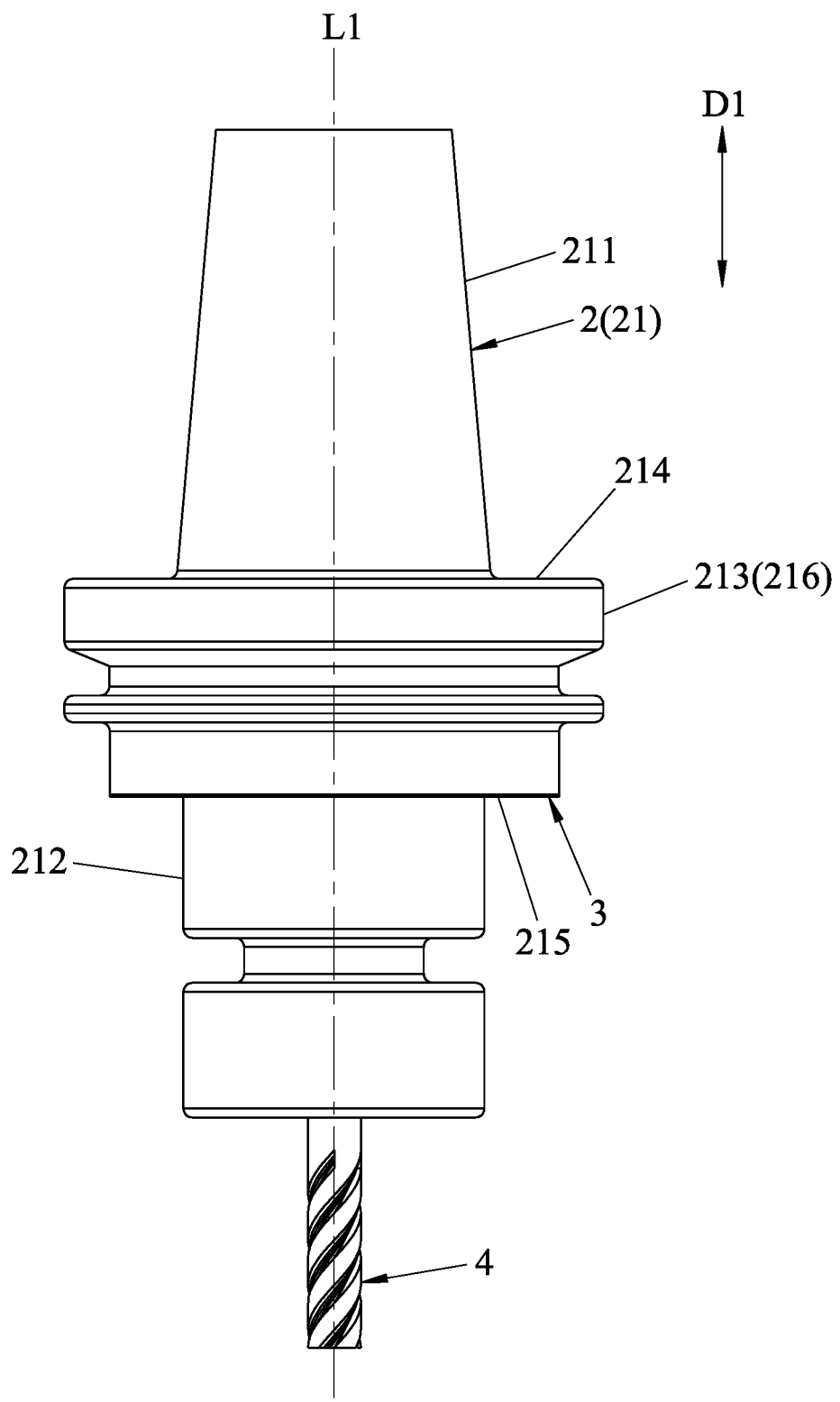
FIG. 2 is a front view of a cutter tool holder and a cutter tool of the first embodiment.

Referring to FIGS. 1 and 2, a first embodiment of a self-balancing line shaft of a machine tool according to the disclosure includes a spindle device 1, a cutter tool holder 2 and a balancing assembly 3.

The spindle device 1 includes a spindle 11 which extends along an axis (L1) and is driven to be rotated about the axis (L1), and two precision lock nuts 12 which are threadedly engaged with the spindle 11 in an axial direction (D1) of the axis (L1). One of the precision lock nuts 12 is disposed at a central portion of the spindle 11 to abut against bearings of the machine tool, and the other one of the precision lock nuts 12 is disposed at a rear end portion of the spindle 11 to position the spindle 11.

The cutter tool holder 2 is separably and coaxially connected with the spindle 11 to be rotated about the axis (L1). In this embodiment, the cutter tool holder 2 is of BT series. The cutter tool holder 2 includes a holder body 21.

Figure 3:
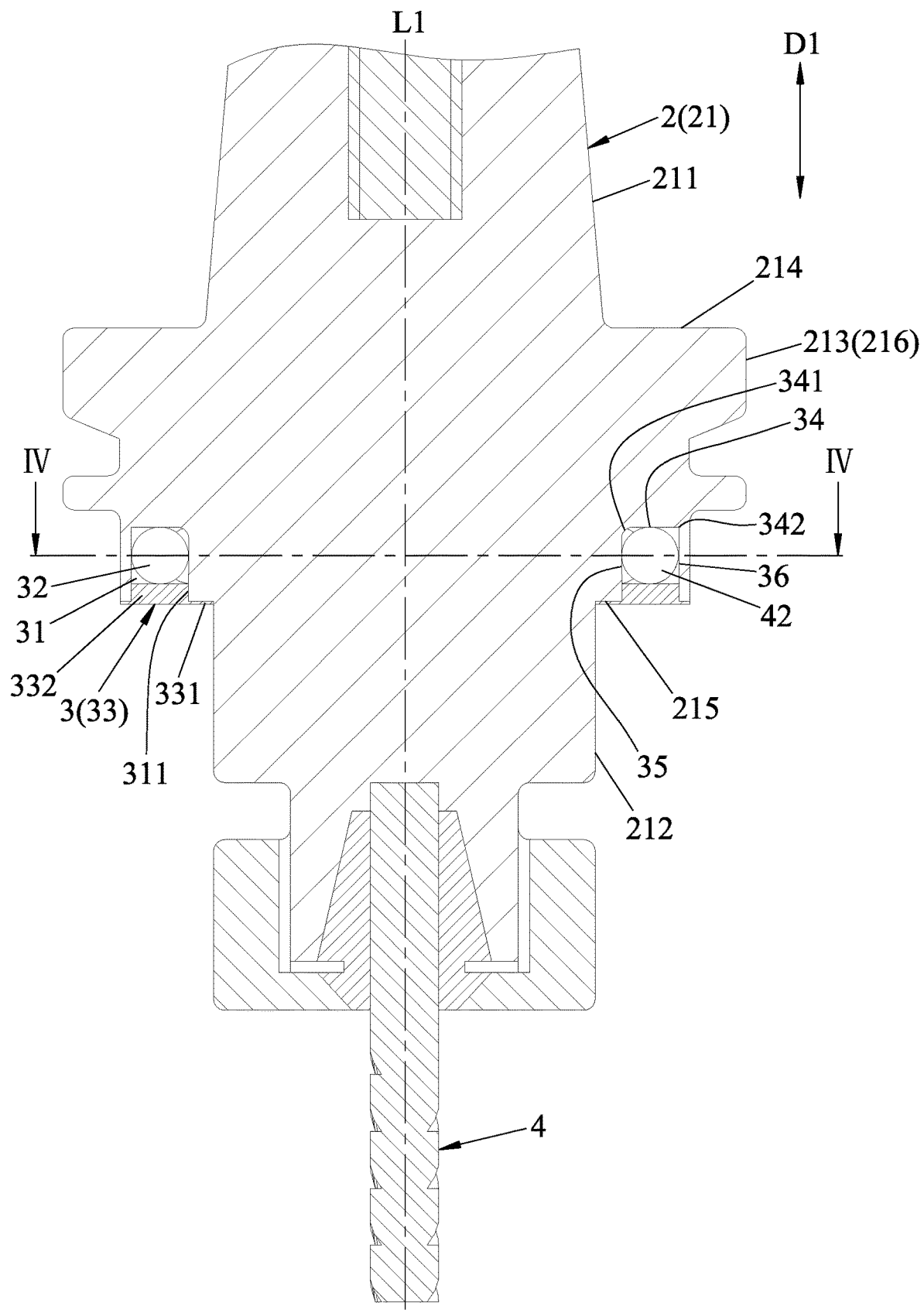
FIG. 3 is a fragmentary sectional view of the cutter tool holder and the cutter of the first embodiment.

Referring to FIGS. 2 and 3, the holder body 21 has a mounting portion 211 which is separably connected to an end portion 111 of the spindle 11 and that extends along the axis (L1), a holding portion 212 which is opposite to the mounting portion 211 along the axis (L1) and for holding a cutter tool 4, and an annular portion 213 which is raised radially and outwardly from the mounting portion 211 and disposed between the mounting portion 211 and the holding portion 212. The annular portion 213 has an upper end surface 214 engaged with the mounting portion 211 and facing the axial direction (D1), a lower end surface 215 opposite to the upper end surface 214 and engaged with the holding portion 212, and an outer peripheral surface 216 interconnecting peripheries of the upper and lower end surfaces 214, 215. The holder 2 may be provided with a holding element, such as a collet, rivet, etc., in accordance with the cutter tool 2, and the holder body 21 may be formed with a channel therein for a cutting fluid.

Figure 4:
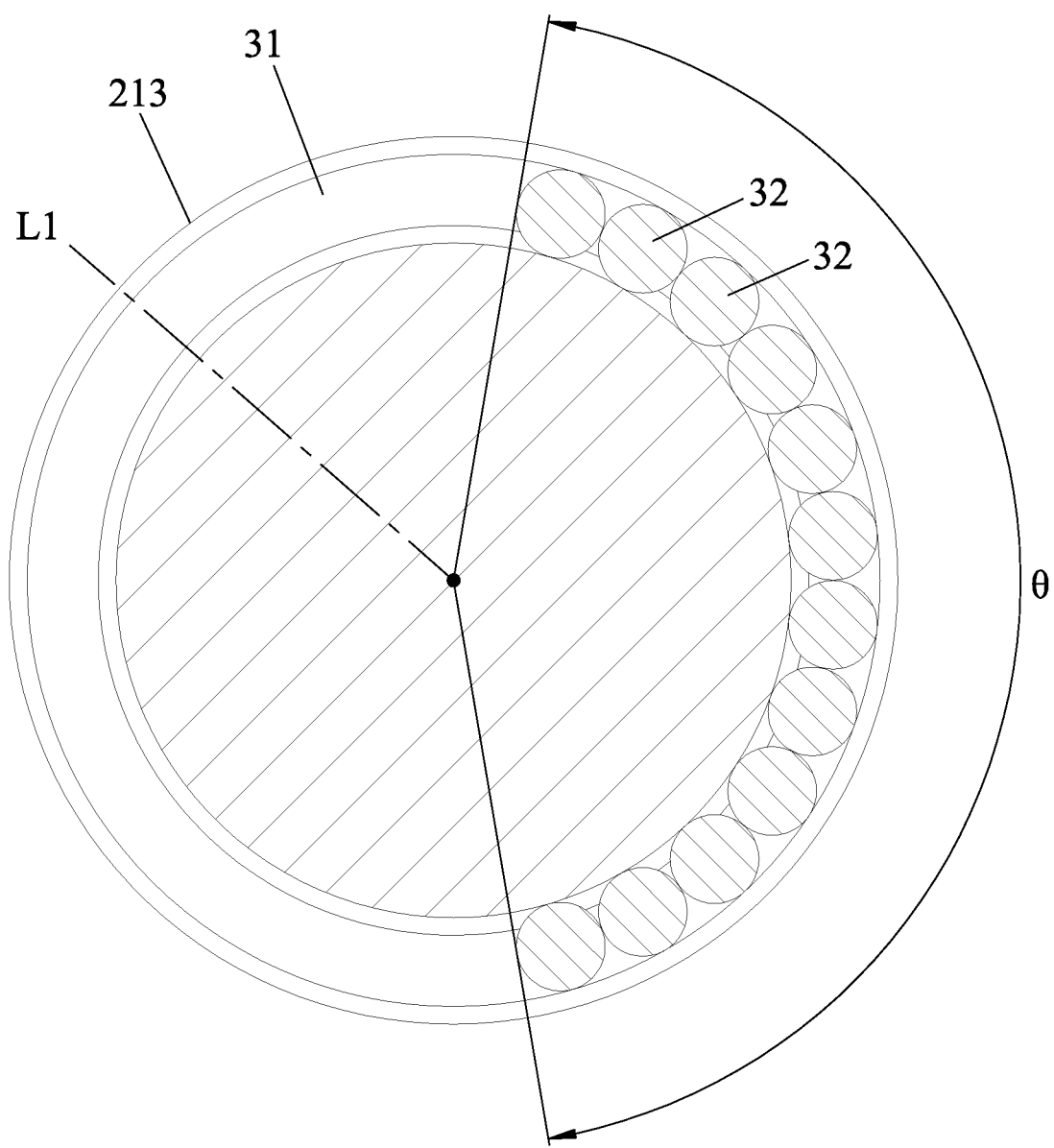
FIG. 4 is a cross-sectional view taken along line IV-IV of FIG. 3.

With reference to FIGS. 3 and 4, the balancing assembly 3 is disposed on the cutter tool holder 2. The balancing assembly 3 includes an annular groove 31 which is formed in the annular portion 213 of the holder body 21 and extends along a circle path that surrounds the axis (L1), a plurality of weight members 32 which are movable and disposed in the annular groove 31 along the circle path, and a cover plate 33.

The annular groove 31 is formed in and concaved from the lower end surface 215 of the holder body 21, and has an access opening 311 at the lower end surface 215. The annular groove 31 is bordered by a groove bottom wall 34, a radially inner groove wall 35, and a radially outer groove wall 36. The groove bottom wall 34 is opposite to the access opening 311 in the axial direction (D1), and has radially inner and outer edges 341, 342 each of which surrounds the axis (L1). The radially inner groove wall 35 extends from the radially inner edge 341 in the axial direction (D1), and the radially outer groove wall 36 extends from the radially outer edge 342 in the axial direction (D1).

The cover plate 33 has a covering portion 332 which is disposed in the annular groove 31 to close the access opening 311, and a flat flange portion 331 which extends radially from the covering portion 332 to abut against the lower end surface 215. The groove bottom wall 34, the radially inner groove wall 35, the radially outer groove wall 36 and the covering portion 332 cooperatively define a volume of the annular groove 31. In assembly, the weight members 32 are received in the annular groove 31, and the cover plate 33 is then secured to the lower end surface 215 in a fastening or welding manner to seal the access opening 311.

The weight members 32 are restrained in the annular groove 31 by virtue of the cover plate 33 covering the access opening 311, and a total volume of the weight members 32 is not larger than half of the volume of the annular groove 31 such that, when the weight members 32 are adjoined to one another in the annular groove 31, two terminal sides, each of which is defined by interconnecting a respective one of outermost ones of the weight members 32 and the axis (L1), cooperatively form an included angle (θ) that is not more than 180 degrees (see FIG. 4).

In this embodiment, the weight members 32 are beads and the number of the weight members 32 is even. The weight members 32 may be lubricated to reduce the impact of friction to the movement of the weight members 32 in the annular groove 31. Alternatively, the weight members 32 maybe in the form of liquid, solid or a mixture of liquid and solid.

When the spindle device 1 is rotated with the rotational speed higher than a natural frequency of the line shaft, the weight members 32 of the balancing assembly 3 are driven by centrifugal force to move in a direction opposite to the rotation unbalance such that the center of mass of the whole rotating system is close to a central line (i.e., the axis (L1)) to alleviate chatter and undesired vibration due to the unbalance amount. Thus, the machine tool has to be shut off less often, which decreases downtime of the spindle device 1 and the cutter tool holder 2.

In various embodiments, the number of the balancing assemblies 3 may be varied in accordance with the position occurring and amount of the rotating unbalance. The annular groove 31 may be alternatively formed in the upper end surface 214 to render the structure of the holder body simple without adversely affecting the rigidity thereof. With the radially outer groove wall 36 integrally formed as part of the holder body 21 not to be deformed by the centrifugal action of the weight members 32 during the rotation, a roundness of the annular groove 31 can be maintained so as to prevent deflection of the weight members 32.

Moreover, in this embodiment, the annular groove 31 is formed in the lower end surface 215 of the holder body 21 at which a rotating unbalance often occurs, and is easily machined in a manufacturing process, which can provide the line shaft with a great self-balancing effect. With the cover plate 33 having the covering portion 332 cooperating with the groove bottom wall 34 to define the annular groove 31, a position of the annular groove 31 in the axial direction (D1) can be controlled precisely during the manufacturing process.

Furthermore, the groove bottom wall 34 and the radially outer groove wall 36 may be annular so as to minimize friction of the weight members 32 during its rolling movement in the annular groove 31. In this embodiment, the self-balancing line shaft is employed on a grinding machine tool in which a tool spindle is uni-directionally rotated at a high speed. The self-balancing line shaft may be alternatively used with other machine tools.

Figure 5:
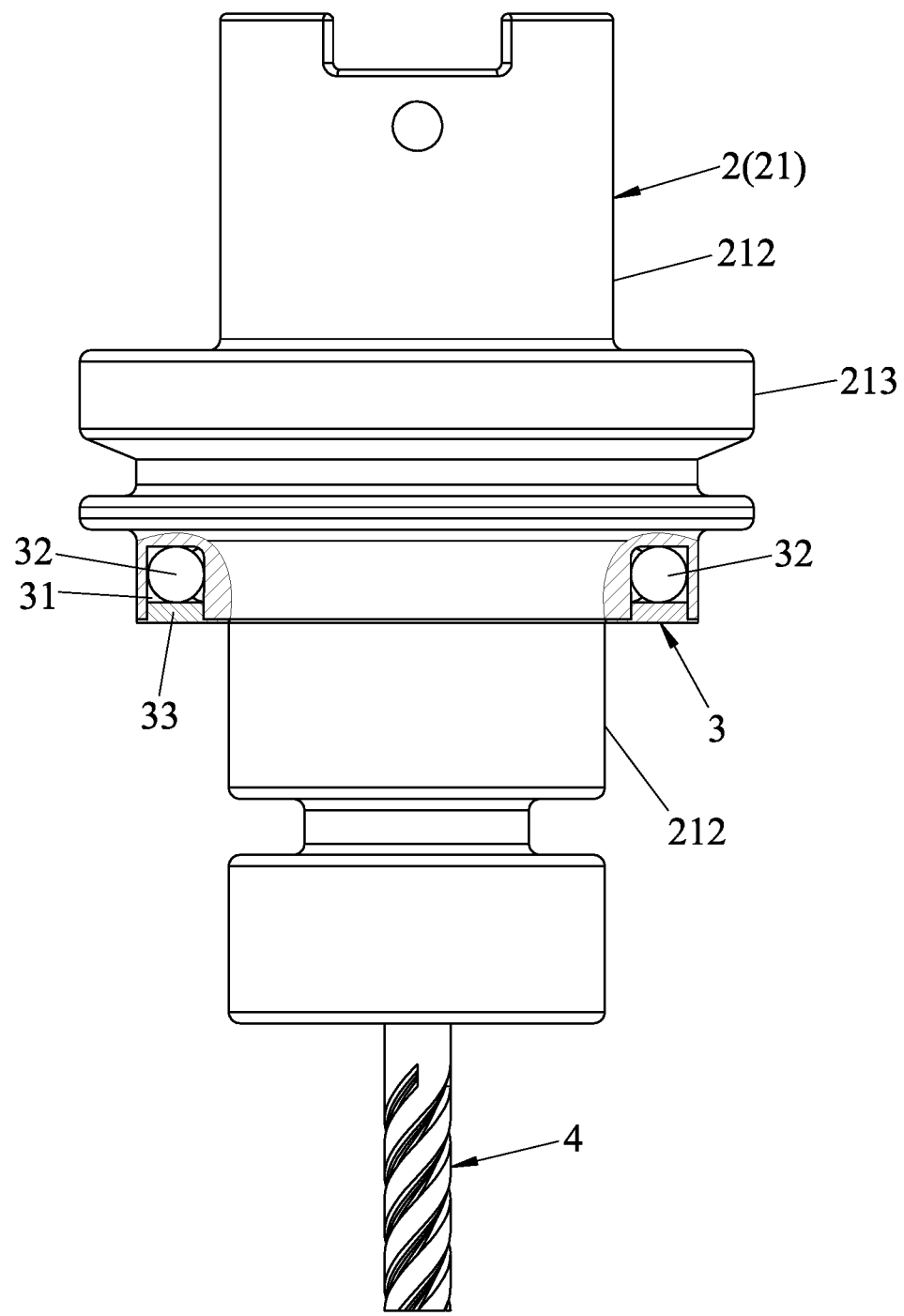
FIG. 5 is a partly sectional view illustrating a cutter tool holder and a cutter tool of a second embodiment of a self-balancing line shaft of a machine tool according to the disclosure.

Referring to FIG. 5, in a second embodiment, the cutter tool holder 2 is of HSK series.

Figure 6:
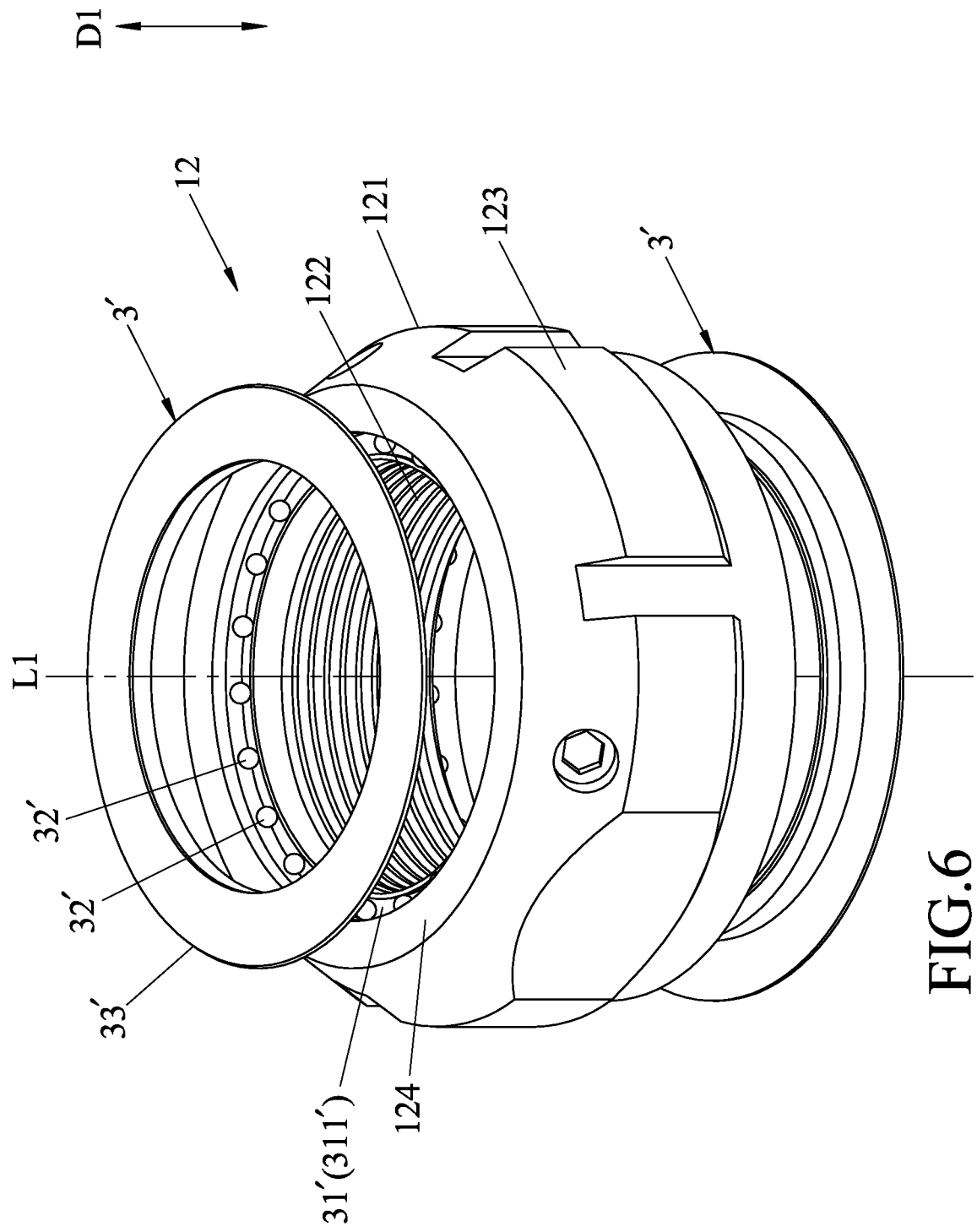
FIG. 6 is an exploded perspective view illustrating a precision lock nut of a third embodiment of a self-balancing line shaft of a machine tool according to the disclosure.
Figure 7:
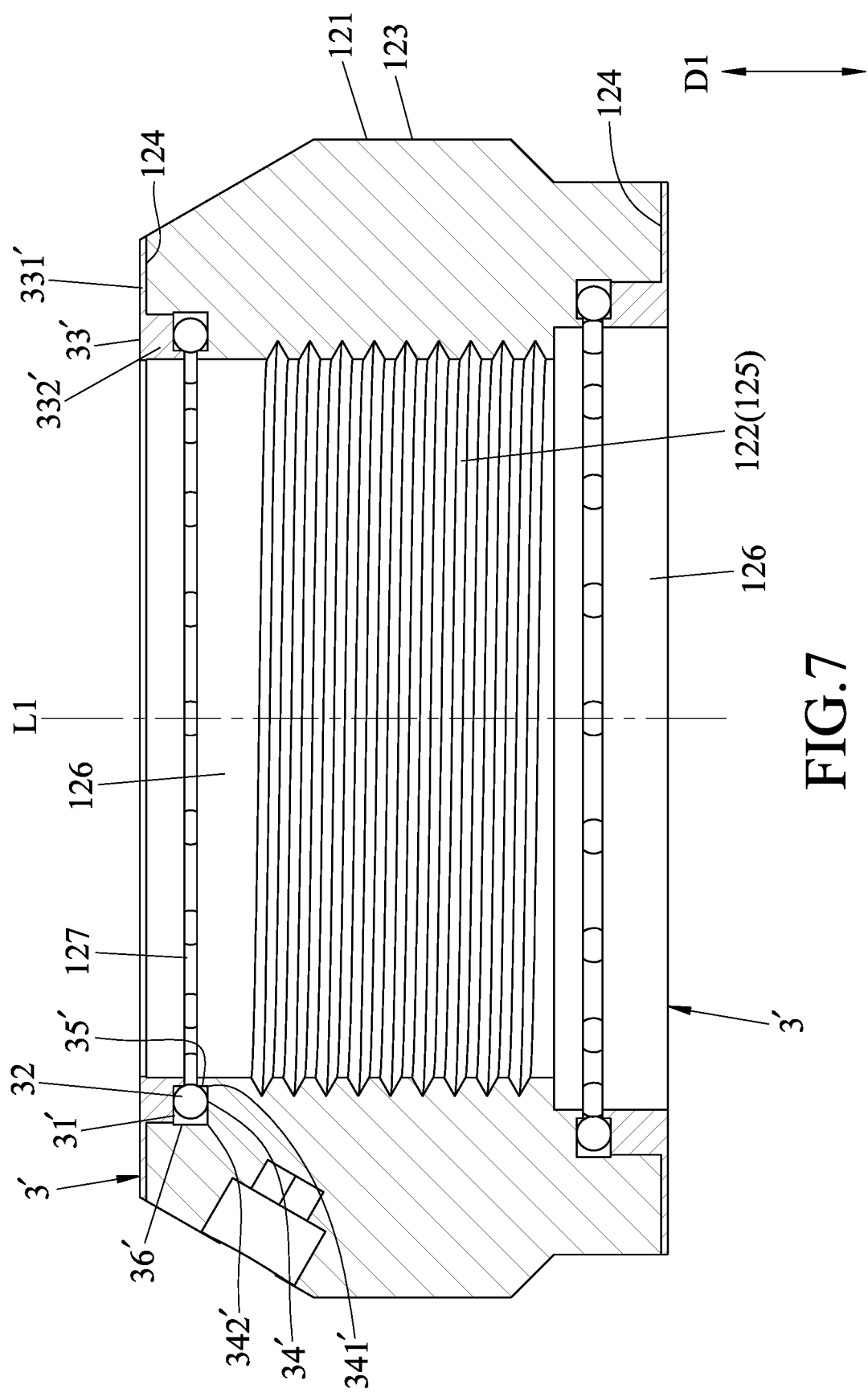
FIG. 7 is a sectional view of the precision lock nut of the third embodiment.

Referring to FIGS. 1, 6 and 7, in a third embodiment, each precision lock nut 12 of the spindle device 1 has a ring-shaped nut body 121 which has inner and outer ring surfaces 122, 123 surrounding the axis (L1) and radially opposite to each other, and two ring end surfaces 124 interconnecting the inner and outer ring surfaces 122, 123 and opposite to each other along the axis (L1). The inner ring surface 122 has an internal thread section 125 and two extending sections 126 each extending from the inner thread section 125 to one of the ring end surfaces 124. Each of the extending sections 126 may have an annular gap 127 formed therein and around the axis (L1).

In this embodiment, two of the balancing assemblies 3' are disposed on each of the precision lock nuts 12. The annular grooves 31' of the balancing assemblies 3' are formed in and concaved from the ring end surfaces 124 of the nut body 121, respectively, and are respectively communicated with the annular gaps 127. Specifically, the annular groove 31' has an access opening 311' at the ring end surface 124. The annular groove 31' is bordered by a groove bottom wall 34' which is opposite to the access opening 311' in the axial direction (D1) and which has radially inner and outer edges 341', 342' each surrounding the axis (L1), a radially inner groove wall 35' which extends from the radially inner edge 341' in the axial direction (D1), and a radially outer groove wall 36' which extends from the radially outer edge 342' in the axial direction (D1). The cover plate 33' covers the access opening 311' so as to restrain the weight members 32' in the annular groove 31'. Similarly, the cover plate 33' has a covering portion 332' which is disposed in the annular groove 31' to close the access opening 311', and a flange portion 331' which extends radially from the covering portion 332' to abut against the ring end surface 124. The groove bottom wall 34', the radially inner groove wall 35', the radially outer groove wall 36' and the covering portion 332' cooperatively define the volume of the annular groove 31'.

In various embodiments, the number of the balancing assemblies 3' may be varied in accordance with the position occurring and amount of the rotating unbalance. The annular groove 31' maybe alternatively formed in the extending section 126 of the inner ring surface 122 of the nut body 121 to render the structure of the nut body 121 simple without adversely affecting the rigidity thereof. With the radially outer groove wall 36' integrally formed as part of the nut body 121 not to be deformed by a centrifugal action of the weight members 32' during the rotation, a roundness of the annular groove 31' can be maintained so as to prevent deflection of the weight members 32'. Moreover, in this embodiment, the annular grooves 31' are formed in the ring end surfaces 124 of the nut body 121 at which a rotating unbalance often occurs, which can provide the line shaft with a great self-balancing effect.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A self-balancing line shaft of a machine tool comprising:
   a spindle device including a spindle which extends along an axis and is driven to be rotated about the axis, and at least one precision lock nut which is threadedly engaged with said spindle in an axial direction of the axis, said precision lock nut having a ring-shaped nut body which has inner and outer ring surfaces surrounding the axis and radially opposite to each other, and two ring end surfaces interconnecting said inner and outer ring surfaces and opposite to each other along the axis, said inner ring surface having an internal thread section;
   a cutter tool holder coaxially connected with said spindle to be rotated about the axis, said cutter tool holder including a holder body which has a mounting portion that is separably connected to an end portion of said spindle and that extends along the axis, a holding portion that is opposite to said mounting portion along the axis and for holding a cutter tool, and an annular portion that is raised radially and outwardly from said mounting portion and that is disposed between said mounting portion and said holding portion, said annular portion of said holder body having an upper end surface engaged with said mounting portion and facing the axial direction, a lower end surface opposite to said upper end surface and engaged with said holding portion, and an outer peripheral surface interconnecting peripheries of said upper and lower end surfaces; and
   at least one balancing assembly disposed on said precision lock nut, said balancing assembly including an annular groove which is formed in said nut body and which extends along a circle path that surrounds the axis, a plurality of weight members which are movable and disposed in said annular groove along the circle path, and a cover plate, said annular groove being formed in one of said upper end surface, said lower end surface, and said ring end surfaces of said nut body, said annular groove having an access opening at said one of said upper end surface, said lower end surface, and said ring end surfaces of said nut body, said cover plate covering said access opening so as to restrain said weight members in said annular groove, said cover plate having a covering portion which is disposed in said annular groove to close said access opening, and a flange portion which extends radially from said covering portion to abut against said one of said upper end surface, said lower end surface, and said ring end surfaces of said nut body, said annular groove being bordered by a groove bottom wall which is opposite to said access opening in the axial direction and which has radially inner and outer edges each surrounding the axis, a radially inner groove wall which extends from said radially inner edge in the axial direction, and a radially outer groove wall which extends from said radially outer edge in the axial direction, said groove bottom wall, said radially inner groove wall, said radially outer groove wall and said covering portion cooperatively defining a volume of said annular groove, a total volume of said weight members being not larger than half of said volume of said annular groove such that, when said weight members are adjoined to one another in said annular groove, two terminal sides each defined by interconnecting an outermost one of said weight members and the axis cooperatively form an included angle that is not more than 180 degrees.

2. The self-balancing line shaft as claimed in claim 1, wherein said annular groove is formed in and concaved from said lower end surface such that said access opening is formed in said lower end surface, and said flange portion of said cover plate abuts against said lower end surface.

3. The self-balancing line shaft as claimed in claim 1, wherein said annular groove is formed in and concaved from one of said ring end surfaces of said nut body such that said access opening is formed in said one ring end surface, and said flange portion of said cover plate abuts against said one ring end surface.

4. The self-balancing line shaft as claimed in claim 1, wherein said inner ring surface of said nut body has an inner thread section and at least one extending section extending from said inner thread section to one of said ring end surfaces, said annular groove being formed in and concaved from said one ring end surface, said extending section having an annular gap which is formed therein and around the axis, and which is communicated with said annular groove.

* * * * *